US011138477B2

(12) United States Patent
Tandecki et al.

(10) Patent No.: US 11,138,477 B2
(45) Date of Patent: Oct. 5, 2021

(54) CLASSIFICATION OF DATA USING AGGREGATED INFORMATION FROM MULTIPLE CLASSIFICATION MODULES

(71) Applicant: COLLIBRA NV, Brussels (BE)

(72) Inventors: Michael Tandecki, Vilvoorde (BE); Michael Maes, Brussegem (BE); Gretel De Paepe, Watermaal-Bosvoorde (BE); Anna Filipiak, Ostrow Wielkopolski (PL)

(73) Assignee: COLLIBRA NV, Brussels (BE)

( * ) Notice: Subject to any disclaimer, the term of this patent is extended or adjusted under 35 U.S.C. 154(b) by 235 days.

(21) Appl. No.: 16/542,016

(22) Filed: Aug. 15, 2019

(65) Prior Publication Data
US 2021/0049421 A1 Feb. 18, 2021

(51) Int. Cl.
*G06K 9/62* (2006.01)
*G06F 16/22* (2019.01)

(52) U.S. Cl.
CPC ......... *G06K 9/6267* (2013.01); *G06F 16/221* (2019.01); *G06F 16/2282* (2019.01); *G06K 9/6227* (2013.01); *G06K 9/6256* (2013.01)

(58) Field of Classification Search
CPC .. G06K 9/6267; G06K 9/6227; G06K 9/6256; G06F 16/221; G06F 16/2282
See application file for complete search history.

(56) References Cited

U.S. PATENT DOCUMENTS

| | | | | |
|---|---|---|---|---|
| 5,251,131 A | * | 10/1993 | Masand | G10L 15/18 704/9 |
| 5,537,488 A | * | 7/1996 | Menon | G06K 9/6222 382/170 |
| 6,324,531 B1 | * | 11/2001 | Anderson | G06K 9/62 706/15 |
| 6,341,369 B1 | * | 1/2002 | Degenaro | G06Q 10/10 717/117 |
| 6,697,799 B1 | * | 2/2004 | Neal | G06F 16/951 |

(Continued)

FOREIGN PATENT DOCUMENTS

WO 2016/200667 A1 12/2016

OTHER PUBLICATIONS

PCT/IB2020/057603 International Search Report and Written Opinion dated Sep. 21, 2020, 12 pgs.

*Primary Examiner* — Manav Seth
(74) *Attorney, Agent, or Firm* — Perkins Coie LLP

(57) ABSTRACT

The present disclosure relates to methods and systems to classify data. A set of classification modules may inspect received data and identify proposed classifications for confidence values for the received data. An aggregation module may receive and aggregate the proposed classifications and confidence values. Based on the aggregated proposed classifications and the confidence values, the aggregation module may generate a final classification for the received data. An external device may perform an action with respect to the received data based on the final classification associated with the data. The action performed may include maintaining the data such that the data may be retrieved upon receipt a request for the data. Any of the classification modules and the aggregation module may be based on training data that may be utilized in subsequent iterations of classifying data to increase classification accuracy.

20 Claims, 8 Drawing Sheets

(56) References Cited

U.S. PATENT DOCUMENTS

| | | | | |
|---|---|---|---|---|
| 6,751,600 B1* | 6/2004 | Wolin | | G06F 16/353 |
| | | | | 706/12 |
| 7,043,492 B1* | 5/2006 | Neal | | G06F 16/353 |
| 7,308,378 B2* | 12/2007 | Starzyk | | G06K 9/6217 |
| | | | | 702/120 |
| 7,454,331 B2* | 11/2008 | Vinton | | H03G 5/165 |
| | | | | 704/225 |
| 7,627,154 B2* | 12/2009 | Luo | | G06K 9/4642 |
| | | | | 382/128 |
| 7,648,460 B2* | 1/2010 | Simopoulos | | G16H 30/20 |
| | | | | 600/437 |
| 7,912,246 B1* | 3/2011 | Moon | | G06K 9/00221 |
| | | | | 382/103 |
| 8,160,975 B2* | 4/2012 | Tang | | H04L 51/12 |
| | | | | 706/12 |
| 8,244,652 B2* | 8/2012 | Menahem | | G06N 5/043 |
| | | | | 706/20 |
| 8,468,111 B1* | 6/2013 | Tgavalekos | | G01S 7/003 |
| | | | | 706/45 |
| 8,934,709 B2* | 1/2015 | Saptharishi | | G06K 9/4671 |
| | | | | 382/159 |
| 8,990,327 B2* | 3/2015 | Drews | | H04L 51/32 |
| | | | | 709/206 |
| 9,076,040 B1* | 7/2015 | Jing | | G01C 21/20 |
| 9,147,129 B2* | 9/2015 | Liu | | G06K 9/6256 |
| 9,268,399 B2* | 2/2016 | Grokop | | G06F 1/3287 |
| 9,317,613 B2* | 4/2016 | Selvaraj | | G06F 16/9535 |
| 9,317,785 B1* | 4/2016 | Moon | | G06K 9/00288 |
| 9,603,123 B1* | 3/2017 | Jackson | | H04W 68/02 |
| 9,760,803 B2* | 9/2017 | Kulick | | G06F 16/51 |
| 10,089,287 B2* | 10/2018 | Rebstock | | G06F 16/93 |
| 10,133,922 B2* | 11/2018 | Saptharishi | | G06T 7/73 |
| 10,943,346 B2* | 3/2021 | Wirch | | G06K 9/4642 |
| 2003/0204384 A1* | 10/2003 | Owechko | | G06K 9/209 |
| | | | | 703/1 |
| 2006/0039593 A1* | 2/2006 | Sammak | | G06K 9/00127 |
| | | | | 382/133 |
| 2008/0249764 A1* | 10/2008 | Huang | | G06F 40/30 |
| | | | | 704/9 |
| 2009/0182696 A1* | 7/2009 | Menahem | | G06N 20/00 |
| | | | | 706/20 |
| 2010/0124378 A1* | 5/2010 | Das | | G06F 16/285 |
| | | | | 382/225 |
| 2010/0260406 A1* | 10/2010 | Sammak | | G06K 9/00127 |
| | | | | 382/133 |
| 2011/0099199 A1* | 4/2011 | Stalenhoef | | G06F 16/51 |
| | | | | 707/770 |
| 2012/0027285 A1* | 2/2012 | Shlain | | G06K 9/6256 |
| | | | | 382/149 |
| 2012/0106854 A1* | 5/2012 | Tang | | G06K 9/6292 |
| | | | | 382/224 |
| 2014/0140625 A1* | 5/2014 | Zhang | | G06K 9/00677 |
| | | | | 382/195 |
| 2015/0169575 A1* | 6/2015 | Adam | | G06F 16/58 |
| | | | | 707/728 |
| 2015/0269431 A1* | 9/2015 | Haji | | G06K 9/00879 |
| | | | | 382/186 |
| 2017/0068871 A1* | 3/2017 | Abdulkader | | G06K 9/4652 |
| 2017/0278013 A1* | 9/2017 | Yu | | G06N 20/20 |
| 2018/0083970 A1* | 3/2018 | Ma | | G06F 16/00 |
| 2019/0354757 A1* | 11/2019 | Saptharishi | | H04N 5/23206 |

* cited by examiner

| CLASSIFICATION 502 | HIERARCHY/ SUBTYPE 504 | REGULATION 506 | PII 508 | GDPR 510 |
|---|---|---|---|---|
| NAMES | FIRST NAME MIDDLE NAME | X | X | X |
| STATE | FULL US STATE US STATE CODE | | | |
| COUNTRY | FULL COUNTRY COUNTRY CODE | | | |
| GENDER | | X | X | X |
| OCCUPATION | | | | |
| DATE | MONTH WEEKDAY | | | |
| LANGUAGE | LANGUAGE CODE LANGUAGE ISO | | | |
| EMAIL | | X | X | X |
| IBAN | | | | |
| GUID/UUID | | | | |
| IP ADDRESS | IPV4 IPV6 | X | X | X |
| HEALTH | | X | | |
| RELIGION | | X | | |

FIGURE 5

CLASSIFICATION OF DATA USING AGGREGATED INFORMATION FROM MULTIPLE CLASSIFICATION MODULES

TECHNICAL FIELD

This disclosure relates to data classification, and, in particular, to classifying data using aggregated classification information generated from multiple classification modules.

BACKGROUND

Computing systems can receive and process various types of data. For example, a computing device can process a stream of data that represents various characteristics of a digital documents. The computing system may process the stream of data to identify the characteristics (e.g., names, addresses, business-related information, personal information) included in the stream of data.

In many cases, computing systems may classify portions of data included in a stream of data to identify the nature of the data. As an example, a first portion of a stream of data may be classified as a name of an individual and a second portion of the stream of data may be classified as a personal identifier (e.g., government issued identification number) of the individual.

The computing system may take an action (e.g., store the portion of data, delete the portion of data, transmit the portion of data to an external device) based on the classification of a portion of data. In some cases, some classifications may represent personal or sensitive data. Upon determining that a classification for a portion of data includes personal/sensitive data, the action taken with respect to the portion of data may be based on the personal/sensitive nature of the data. For example, data classified as sensitive data may be stored in specific portion(s) of memory or deleted to protect the sensitive nature of the data.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

FIG. 5 illustrates a block diagram of a table of potential data classifications, in accordance with various embodiments.

Figure 1:
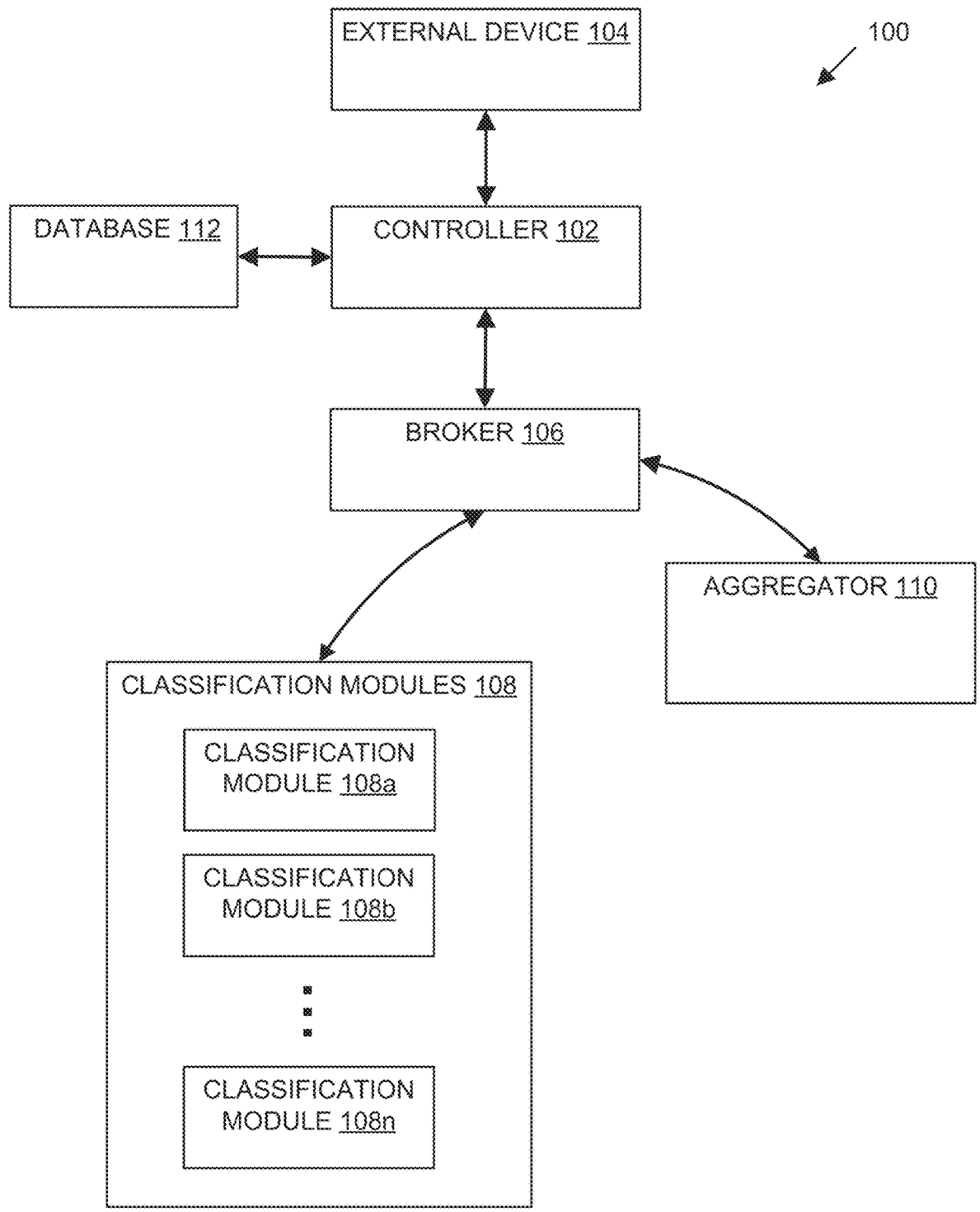
FIG. 1 illustrates a block diagram of a production architecture for classifying data, in accordance with various embodiments.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to examine video content generated by an electronic device, identify elements included in the video content, apply a classification model to determine an appropriate action, and perform the appropriate action.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

Overview

Computing systems can receive and process one or more streams of data (e.g., structured data) to identify characteristics of the data and perform actions based on the characteristics of the data. For example, a computing system can ingest a database and identify various characteristics of the database columns (e.g., names, addresses, phone numbers) included in the database. Characteristics of a database may be included as portions of a stream of data ingested by the computing system.

In many cases, computing systems can ingest and process a plurality of streams of data, which may be computational-resource intensive. To identify the nature of portions of data included in each portion of data, the computing system may identify an appropriate classification for the data that indicates the nature of the data. For example, a computing device may inspect a database column of structured data to classify a first portion of a digitized document as text relating to a name of an individual and a second portion of the digitized document as text relating to a country. The classification associated with a portion of data may be utilized to identify the nature of the data by inspecting the classification rather than processing the associated data, which may be less computational-resource intensive.

An action with respect to a portion of a stream of data may be taken based on a classification of the portion of the stream of data. Examples of actions that may be taken for a portion of a stream of data may include any of storing the data in a specific location in memory, transmitting the data to an external device, deleting the data, etc.

In many cases, a classification for a portion of data can indicate that the portion of data includes confidential/sensitive data. For example, a classification can indicate that the data includes personally-identifiable information (PII) that may be indicative of an individual. Based on such a classification, the computing system may take an action (e.g., store the data in a specific portion of memory) to protect the confidential nature of the data.

Further, various jurisdictions may have laws or regulations that include specific rules relating to handling, dissemination, and storage of specific types of data. For example, a law may include rules indicating that all personally-identifiable information (PII) associated with an individual be identified and maintained in such a way that the individual may request access to their PII or request such information be deleted. In this event, the computing system may take an appropriate action with such information to be able to identify data classified as PII for a specific individual. For example, all classified data that includes PII indicative of a first individual may be stored in a first portion of memory, where the data can be deleted or transmitted to an external device upon request by the first individual.

However, in many cases, a classification associated with a portion of data may be inaccurate. For example, a computing system may inspect a portion of data including the text "Christian," and classify it as a "religion," but the accurate classification is a "name." Such improper classifications may result in improper storage and handling of the data. Further, improper classification of data may result in non-compliance with various laws/regulations in some jurisdictions. For example, if data representing PII is inappropriately classified as non-sensitive data, the data representing PII may be stored in an inappropriate portion of memory, or accessible by unauthorized entities, for example, in violation of laws/regulations in that jurisdiction.

System Overview

The present embodiments relate to classifying portions of data using aggregated classification information received from multiple classification modules. Multiple classification modules may use various techniques (e.g., dictionaries, regular expression (Regex) pattern matching, a neural network) to inspect received data and determine proposed classification(s) for the data and a confidence level in each proposed classification. The varying techniques utilized by the classification modules may provide one or more proposed classifications with differing confidences in each proposed classification.

Additionally, an aggregation module (or "aggregator") can receive and combine the proposed classifications and confidences and inspect the aggregated information to determine a final classification for the data that represents a classification with a greater degree of accuracy. Based on the final classification determined by the aggregator, a further action (e.g., storing the data, sending the data to a client device, encrypting the data) can be performed.

FIG. 1 illustrates a block diagram of a production architecture 100 for classifying data, in accordance with various embodiments. The production architecture 100 may ingest various types of structured data (e.g., a column of a table included in a database, names and addresses) and determine classification for portions of the data.

A controller 102 may include a computing device (e.g., a computer, server, series of interconnected servers) configured to obtain one or more streams of structured data representing ingested information of varying types from an external device 104. For example, external device 104 may include device configured to obtain structured data, such as a server. In some embodiments, the controller 102 may receive the stream(s) of data (e.g., columns of structured data) from a database 112. In an alternative embodiment, external device 104 may include any device configured to capture or receive a stream of data (e.g., a sensor, image scanner). In some embodiments, one or more external devices 104 may connect to controller 102 via a gateway.

The streams of data can include data of various types (e.g., addresses, names). The streams of data can comprise multiple portions of data, such as, for example, a database column included in a database. As an example, a stream of data can include information (e.g., data, metadata) associated with a digitized document, where a first portion of data includes a social security number of an individual, and a second portion of data includes terms of a contract included in the document.

The controller 102 may communicate with a broker 106. Broker 106 may include a computing device configured to forward information between controller 102 and components of the production architecture 100 (e.g., classification modules 108, aggregator 110, etc.). For example, the broker 106 may forward structured data from controller 102 to a set of classification modules 108. The broker 106 may receive proposed classifications from classification modules 108a-n and forward the proposed classifications to the aggregator 110. Broker 106 may receive final classifications from the aggregator 110 and forward the final classifications to controller 102. In some embodiments, a production architecture 100 may include multiple brokers 106, where each broker 106 forwards information between controller 102 and a set of classification modules (e.g., classification modules 108a-n) and an aggregator (e.g., aggregator 110).

The set of classification modules 108 can include multiple modules configured to inspect received data and determine a proposed classification for the data. Classification modules 108a-n may utilize various techniques (e.g., dictionary matching, Regex pattern matching) to associate the received data with a proposed classification with a specific confidence level indicative of a confidence in the accuracy of the proposed classification.

The proposed classifications and confidence levels generated from each of the set of classification modules 108 may be forwarded to an aggregator 110 via a broker 106. Aggregator 110 can inspect and aggregate the proposed classifications to determine a final classification. The final classification may include an identified classification for data that is based on a combination of multiple classification techniques.

The controller 102 can receive final classifications from broker 106 and forward the final classifications to external device 104. External device 104 may be configured to perform a subsequent action (e.g., store the data in a first location in memory of any of the controller 102 or database 112, send the data to an external device 104, update database 112) based on the final classification.

Any of the classification modules 108, aggregator 110, database 112, etc., may be executed on one or more computing devices, such as a series of interconnected servers, for example.

Figure 2:
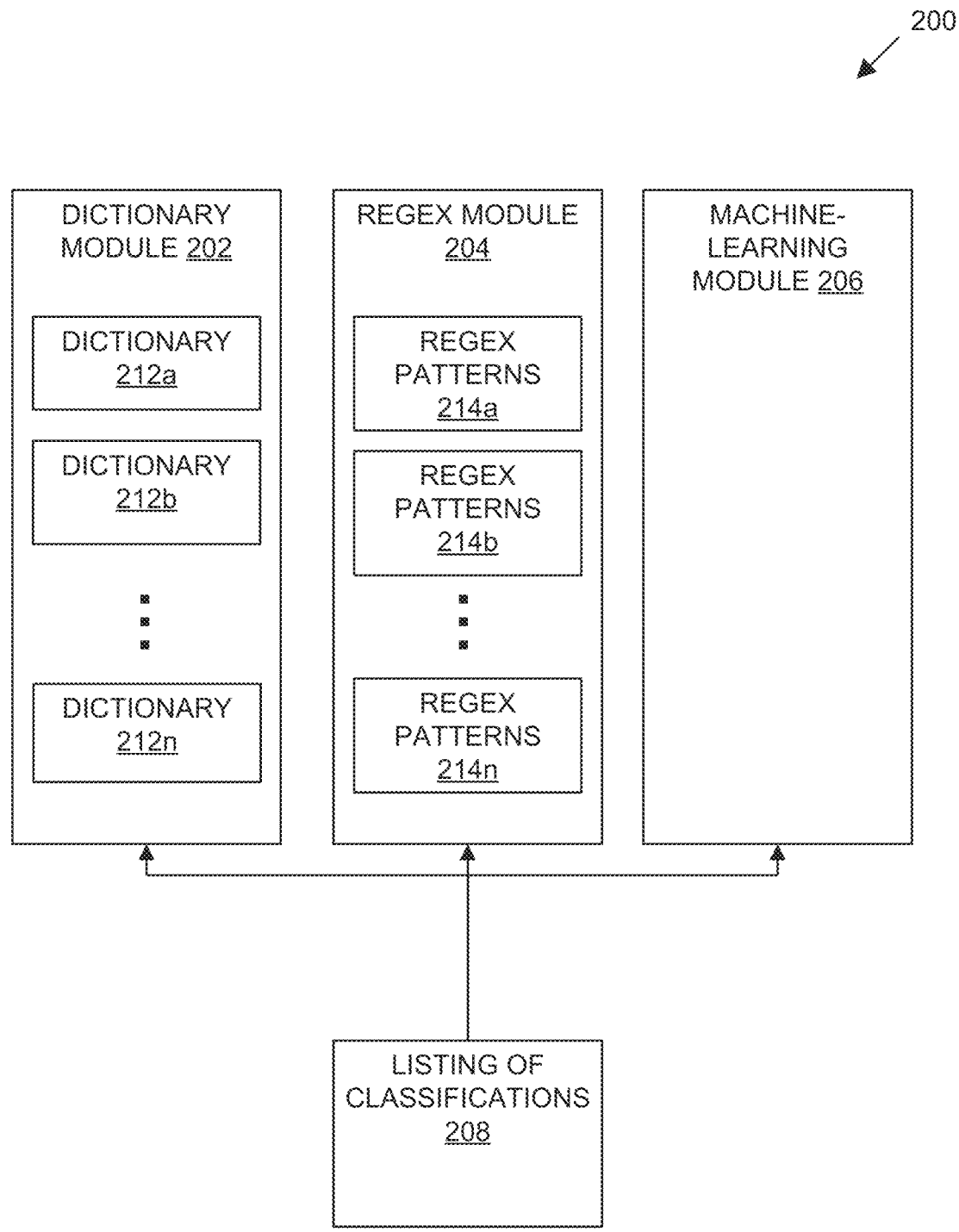
FIG. 2 illustrates a block diagram of a set of classification modules, in accordance with various embodiments.

FIG. 2 illustrates a block diagram of a set of classification modules 200, in accordance with various embodiments. As noted above, multiple classification modules (e.g., 202, 204, 206) included in a set of classification modules 200 may inspect data and determine a proposed classification based on characteristics of the data.

In the embodiment as shown in FIG. 2, the set of classification modules 200 may include a dictionary module 202, a regular expression (Regex) module 204, and a machine-learning module 206. In some embodiments, each classification module 202, 204, 206 may receive data from a broker simultaneously. In another embodiment, the data may be forwarded to the classification modules 202, 204, 206 in a specific sequence.

As shown in FIG. 2, each of the set of classification modules 200 may access a listing of classifications 208. The listing of classifications 208 may include a listing of all potential classifications for data. Examples of potential classifications listed in the listing of classifications 208 can include personal information (e.g., name, address, social security number, political information), location information (e.g., country, city, state), technical information (e.g., internet protocol (IP) address, media access control (MAC) address), etc. The listing of classifications 208 is discussed in greater detail with respect to FIG. 5. The listing of classifications 208 may be predetermined, or, in some embodiments, the listing of classifications 208 can include hierarchies of classification subtypes that provide more detailed classifications for data.

The set of classification modules 200 may include a dictionary module 202. Dictionary module 202 may compare text included in the received data with one or more dictionaries 212a-b. Any dictionary 212a, 212b may include a listing or database of words/phrases and associated definition(s) or common examples of the words/phrases in sentences/paragraphs. The dictionary module 202 may identify one or more proposed classifications based on comparing an identified definition of text included in the data and the listing of classifications 208.

The dictionary module 202 may identify characteristics of received data to identify text included in the data. The identified characteristics can be compared against listings in the dictionary. For example, an identified characteristic of the word "Christian" may match multiple listings in the dictionary 212a, one listing relating to religion, and another listing relating to a given name or surname. The dictionary module 202 may compare the identified characteristics against the matching dictionary listings to identify similarities that can be used in determining a confidence level for each match between the characteristic and the dictionary listing. The matching dictionary listings may be compared to the listing of classifications 208 to identify a classification that represents the proposed classification provided by the dictionary module 202.

The dictionary module 202 may include a confidence level to a proposed classification indicating an estimated accuracy or similarity to the proposed classification. In a first example, if text identified in received text matches only one instance in dictionary 212a, the dictionary module 202 may generate a proposed classification resembling that with a high confidence. In a second example, if the text includes multiple potential definitions (e.g., the word 'Christian' as relating to one of a religion or a name), the dictionary module 202 may identify multiple matches and, as a result, generate a lower confidence level in a proposed classification for the word. A first line in the data may define a minimum number of single-character edits between a received word and a dictionary definition of the word (e.g., Levenshtein Distance) to identify the word as a match. As an example, if text includes state name codes, there may be a match in the dictionary for the state name code, but there may be spelling differences to names or surnames.

In some embodiments, the dictionary module 202 may include a hierarchy of dictionaries. The hierarchy of dictionaries can include multiple dictionaries populated in a taxonomy or hierarchy. As an example, the hierarchy of dictionaries includes a high-level dictionary 212a and a lower-level dictionary 212b. In this example, received text may first be matched to an entry (e.g., match the text to the word "Countries") in the high-level dictionary 212*a*. Based on the match in the high-level dictionary 212*a*, the dictionary module 202 may inspect the lower-level dictionary 212*b* (e.g., a European Country-specific dictionary) to identify a more detailed definition of the text.

The set of classification modules 200 may include a regular expression (Regex) module 204. The Regex module 204 may include a series of Regex patterns 214 (i.e., sequences of characters that define a search pattern). The Regex module 204 may compare the Regex patterns 214 with the received text to identify a Regex pattern 214 that matches the text a similarity that exceeds a threshold similarity. The matching Regex pattern 214 may be compared against the listing of classifications 208 to identify a proposed classification and a confidence level.

In some embodiments, a set of regular expressions may be linked to a single datatype. The Regex module 204 may return a number of samples of given entries that match the given type (i.e., any Regex that is linked to the type). The Regex module 204 may return all the matched types above a threshold similarity with a confidence. The classification modules may be retrained to improve accuracy of the of dictionary searches and regex matches, for example.

The set of classification modules 200 may include a machine learning module 206. The machine learning module 206 may implement a neural network to determine a proposed classification for received data. For example, the machine learning module 206 may identify a set of rules associated with various information that can increase the accuracy and confidence level for proposed classifications of received data. To illustrate, an example may include the machine learning module 206 identifying that a specific arrangement of numbers is a phone number with a country code specifying the United States. The machine learning module 206 may incorporate this information as a rule and utilize the information when inspecting subsequent portions of data. In this example, the machine learning module 206 may identify that a second set of information received is a phone number with a country code specifying the United States based on the rules included in the machine learning module 206. The machine learning module 206 is described with greater detail with respect to FIG. 3.

Any classification module 200 may generate a proposed classification and a confidence level representing an estimated confidence in which the proposed classification accurately reflects the received text. The confidence level may include a value in a range of values representing a quantified confidence in the accuracy of the proposed classification. For example, a confidence level may be a number in the range of 0 to 100, where 100 indicates the highest confidence.

The confidence level may be at least partially based on a number of similarities between the received text and the proposed classification. In some embodiments, the confidence level may be at least partially based on the number of classifications that a classification module matches to the received text, as more classifications that match the receive text may indicate multiple potentially accurate classifications may indicate a lower confidence in a proposed classification. In some embodiments, a classification module may generate multiple proposed classifications and a confidence level associated with each proposed classification.

The classification models may determine a confidence level that estimates a certainty of the proposed classification based on previous classifications performed. The confidence level (or percentage) may be based on training data. In some embodiments, with columnar data, the classification modules may generate a proposed classification for every data entity in a data column, but these proposed classifications may be combined to generate an overall classification for the entire column.

For example, the dictionary search may generate a 90% confidence level for a data entity, indicating that 90 out of 100 samples identify the proposed classification for the received data. As another example, the regex matcher may generate a 90% confidence level indicating that the data matches a Regex pattern in 90% of the samples generated.

In some embodiments, the machine learning module 206 may generate a confidence level for a proposed classification that may differ than confidence levels of other classification modules (e.g., Dictionary module 202, Regex module 204). As an illustration, the machine learning module generating a 90% confidence level indicates that, based on the information that the machine learning module learned from, 90% of sampling times the received data matched the proposed classification.

The machine learning module 206 may use training data to utilize context to provide greater insights into the received text in determining a proposed classification. For example, the machine learning module may utilize training data to identify sets of rules and context information to modify any proposed classification and confidence levels. The training data may allow for the machine learning module to remove a number of potential classifications that are inappropriate classifications of received data. Accordingly, removing potential classifications can increase the confidence level in a proposed classification.

Figure 3:
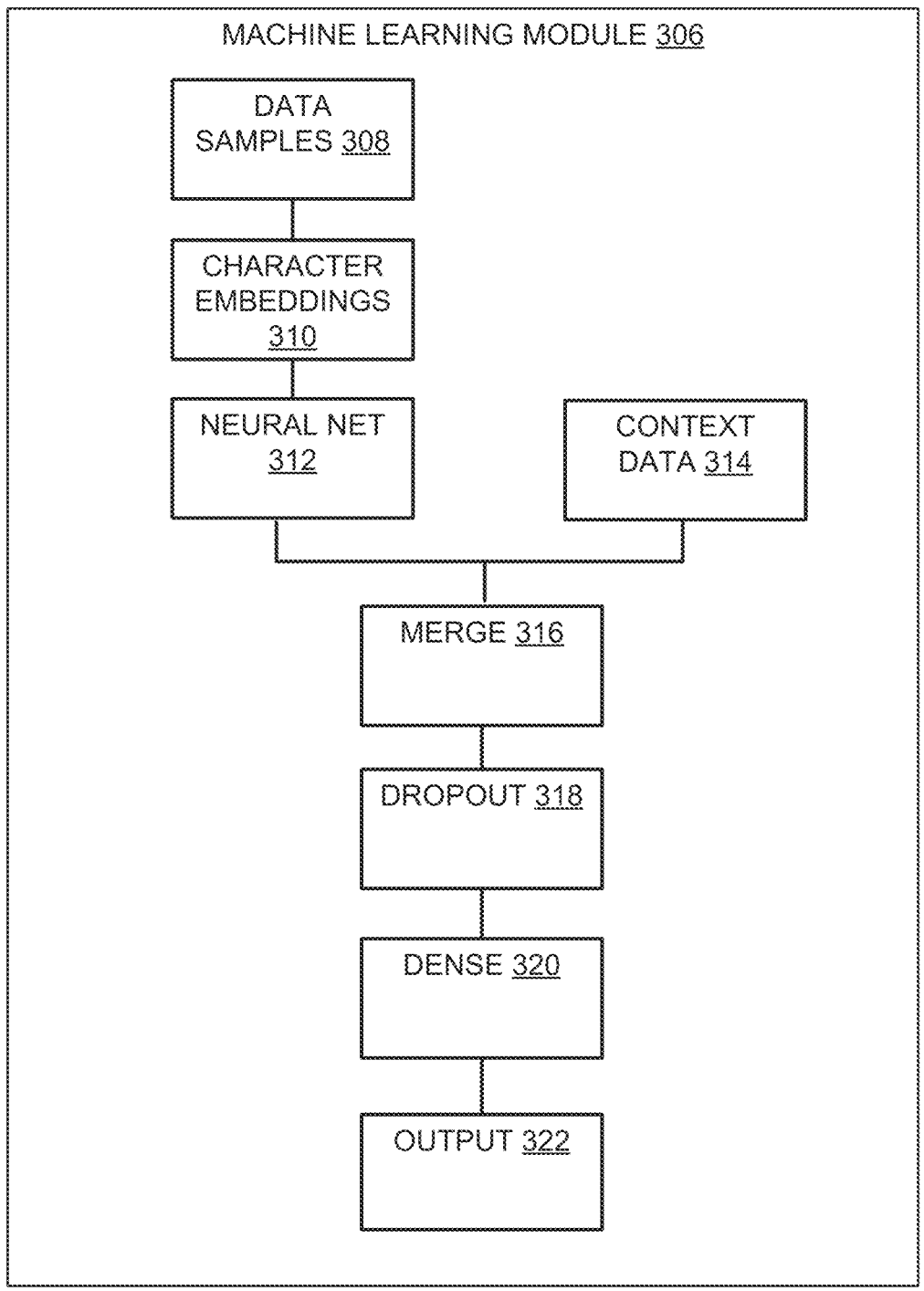
FIG. 3 illustrates a block diagram of a machine learning module, in accordance with various embodiments.

FIG. 3 illustrates a block diagram of a machine learning module 306, in accordance with various embodiments. As noted above, the machine learning module 306 utilizes classification techniques (e.g., dictionary, Regex) as well as training data to determine a proposed classification.

The machine learning module 306 may generate a proposed classification based on data samples 308 that represent sample data of an iteration of a proposed classification generated for received data. In some embodiments, the machine learning module 306 may be trained based on previously-generated classifications of data. An example of data samples 308 can include previously-generated classifications for a plurality of e-mail addresses, common first names, religions, health conditions, etc. The proposed classifications can be transmitted to client devices and feedback relating to the data samples can be received from clients, where the feedback may be integrated into training data. In some embodiments, a training set may be generated for each client/customer.

Character embeddings may be used to learn similarities of characters in sample data with features based on data metadata. The machine learning module 306 may create character embeddings 310. Character embeddings 310 may include modified data samples that may be translated from the data samples into one or more numeric matrices. In some embodiments, an unsupervised learning algorithm may provide a shallow neural network trained to reconstruct linguistic contexts of text. In some embodiments, performing multiple iterations of character embeddings may facilitate the generation of clusters in the numeric matrices. Clusters may represent groupings of classifications and data samples with similar characteristics, where the clusters may be utilized in identifying similarities between a given classification and previous iterations of classifications. An example of a graphical representation of a numerical matrix that identifies clusters is shown with respect to FIG. 4.

The machine learning module 306 may include a neural net. The neural net 312 may have multiple inputs to receive both the data samples 308 and context data 314.

Context data 314 may be utilized in improving the accuracy of the classification of data. As an example, a series of samples may be identified as ['F,' 'M,' 'M,' 'F,' 'F,' 'M,' 'M,' 'F']. From the samples, it may not be conclusive what the classification type is. While it is likely that the samples could relate to 'gender,' the samples could relate to a status field of a product, for example. The context data may provide other information such that there are only two distinct values in the field, where other fields in a table may include 'customer_name,' 'customer_family_status,' etc. Accordingly, the confidence level of a proposed classification that the sample data is for 'gender' is based on the context data. Conversely, if context data includes ten distinct values in the field and other fields in a table include 'product_number,' 'product_status_change_date,' etc., it may be more likely that the proposed classification is not 'gender,' but rather, a classification relating to a project status.

The neural net 312 may be utilized in any of computer vision or natural language processing (NLP) processes. The neural net may include any of a convolutional neural net (CNN) or a recurrent neural net (RNN). The neural net may be utilized to identify characteristics or insights relating to the sample data and/or the character embeddings based on information incorporated by the neural net.

The data samples and the context data may be merged at merge layer 316 and forwarded to dropout 318 and dense 320 layers that include fully connected neural net layers. The dropout 318 layer may avoid overfitting by turning off some features during the learning process, so the model does not put too great of a weight on features that are pronounced in the training set.

The fully connected neural net layers (e.g., neural net 312, merge 316, dropout 318, dense 320) may utilize training data. The training data may include characteristics/insights identified from sample data and character embeddings by the fully connected neural net layers. In some embodiments, the training data may be represented as a set of rules that may be utilized by the machine learning module 306 to modify the proposed classification for received data.

In some embodiments, the machine learning module may identify features based on a column name included in context data. Further iterations of the learning of the machine learning module may include adding features into the learning process while receiving feedback from clients.

The machine learning module 306 may evaluate the fully connected neural net layers and generate an output 322. Evaluating the neural net can include determining one or more accuracy metrics to identify training and testing accuracy of the learning process. Training accuracy metrics may indicate the level of success the training data was utilized in correcting data samples and character embeddings in identifying proposed classifications for received text. The output may be transmitted to an external device requesting feedback as to the accuracy of the output. Any feedback received may be incorporated into the training data.

In some embodiments, the machine learning module 306 may utilize training data and character embeddings to identify various context data included in the received data. Context data may represent contextual information relating to a particular stream of data. For example, context data for a stream of data may indicate that the stream of data generally relates to a digitized contract document. Further, the context data in this example can be utilized to provide context to classifications of data in the stream of data. As this example, the context data can identify that a classification of "Religion" is less likely than a contract-related classification, such as a "Name," for example, because contract documents generally are less likely to include information relating to religions.

Figure 4:
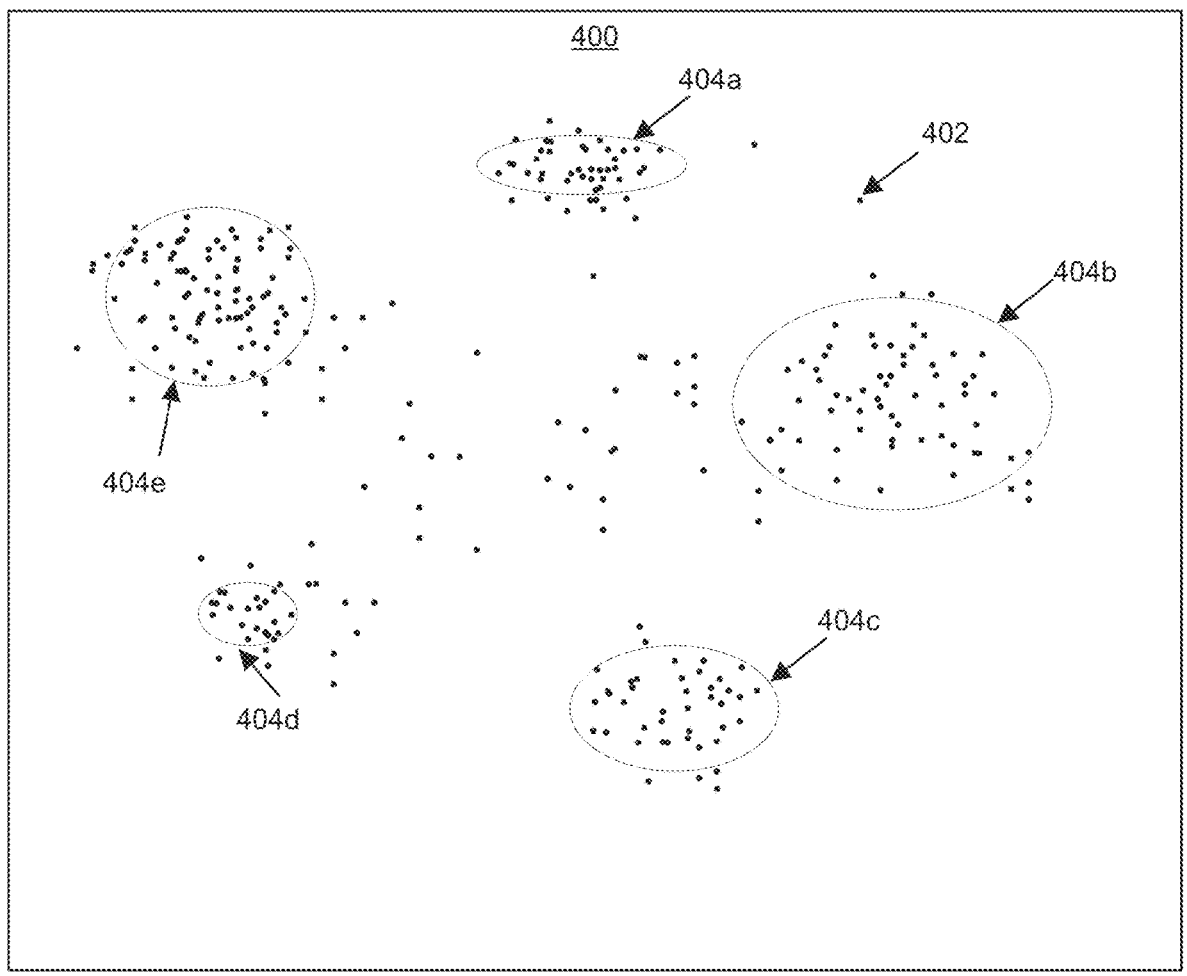
FIG. 4 is an illustration of a graphical representation of clusters of trained classification data, in accordance with various embodiments.

FIG. 4 is an illustration of a graphical representation of clusters of trained classification data, in accordance with various embodiments. As noted above, character embeddings may be used to translate received data and proposed classifications into one or more numeric matrices. As an example, multiple iterations of proposed classifications and associated data may be translated into numeric matrices, where characteristics of the proposed classifications and data are numerically represented in the matrices. Data may be translated from text into vectors that may be incorporated into the numeric matrices.

The character embeddings created by the machine learning module may be included in a machine learning submodule, where the character embeddings can be translated into numeric vectors. The character embeddings can include both a translation of text and a relation of the text to other characters. Clusters can represent a graphical representation of the relation of character embeddings when translated into numeric vectors. As an example, the letter 'a' can be translated into a numeric vector. Clustering can be utilized to determine that the letter 'a' is closer in relation to another letter (e.g., the letter 'b') than another character (e.g., the sign '—').

Further, clustering can be utilized with respect to entire data sets. In other words, data relating to each class (e.g., name, address, IP address) can be translated into numeric vectors and inspected to determine clustering data. As an example, data sets relating to the classes 'name' and 'gender' can be translated into numeric vectors. The numeric vectors can be inspected to determine insights relating to the data classes. In this example, the numeric vectors can be inspected to determine that 'name' and 'gender' classifications are related to one another in a 'personal information' cluster representing classes relating to personal information.

Each instance of translated classification data may be represented as a point 402 in a graphical representation of the numeric matrices. The location of the point 402 on the graphical representation may be based on the translated characteristics (e.g., the classification type, text letters, text words, type of textual character (e.g., Greek character, upper case English character, numbers)), where differing characteristics are given various values in vectors included in the numeric matrices.

In some embodiments, when multiple iterations of proposed classifications and data are translated into numeric matrices, multiple clusters (e.g., clusters 404a-e) may form. A cluster may represent a number of points 402 of the numeric matrices with multiple similarities in their characteristics. For example, a numeric matrix of character embeddings may include a cluster of lower-case English characters, a cluster of numbers, a cluster of upper-case English characters, and a cluster of Greek characters may be identified. Any of the machine learning module or the aggregator can translate data into matrices and identify clusters in the matrices.

In some embodiments, the machine learning module may translate any of a proposed classification, received data, sample data, character embeddings, and training data into numeric matrices. The numeric matrices may include multiple iterations of proposed classifications generated by the machine learning module and associated data. In some embodiments, each of the proposed classifications and associated data may be translated into vectors that are incorporated into the numeric matrices, where the vectors may be represented as a point in a graphical representation of the numeric matrices. The machine learning module may identify clusters that represent common features in various proposed classifications and/or received data.

As an example, a first cluster may be identified in a numeric matrix representing data that includes numerical characters and proposed classifications that commonly are associated with numerical characters (e.g., government issued identifiers, phone numbers). Using this information, a machine learning module can identify if a specific proposed classification and data are included in the first cluster when translating the information into the numeric matrix. The machine learning module can identify that the specific proposed classification and data are included in the first cluster, which may be used to identify that an accurate proposed classification is more likely to be a classification that is commonly associated with numerical characters. This may increase the accuracy and confidence level in identifying a proposed classification for received data.

FIG. 5 illustrates a block diagram of a table of potential data classifications 500, in accordance with various embodiments. As noted above, a listing of classifications 500 may include a database or listing that includes multiple types of classifications 502 that can be associated with a piece of data. Examples of classifications can include any of a name, state, country, city, gender, race, occupation, job title, day, weekday, month, year, language, email, phone number, address, international bank account number (IBAN), globally unique identifier (GUID)/universally unique identifier (UUID), internet protocol (IP) address, national drug code (NDC) code, media-access control (MAC) address, social security number (SSN), health condition, political affiliation, religion, credit card number, etc.

In some embodiments, the listing of classifications may include common terms or characteristics associated with each classification. For example, a classification of a 'state' may have states (e.g., California) associated with the classification to more easily match the classification and the received text.

In some embodiments, a classification can include a hierarchy or subtypes 504 of classifications. For example, a classification of 'country' can dictate a sub-listing of countries (e.g., Country full names, Country codes, European countries), where each sub-sub listing (e.g., Italy, Germany) can give detailed classifications. The hierarchy of classifications can more accurately identify the nature of the received text, as the hierarchy of classifications include more appropriate sub-classes for each classification.

In some embodiments, each classification can indicate whether information with that classification should be treated in a specific way due to a law or regulation 506. For example, A regulation 506 may relate to the handling and maintenance of specific types of data in order to protect the confidentiality of the individual identified in that information. In this example, some types of information (e.g., a name, email, gender, religion) may be subject to such a regulation, where the regulation may require the storage of such data so that all relevant data can be identified and retrieved based on a request to retrieve the information.

In some embodiments, each classification can indicate whether the classification includes personally-identifiable information (PII) 508. PII 508 can include information that can be indicative of an individual, as represented by an 'x' in the table 500. Examples of information that include PII can be a name, email address, IP address, etc.

In some embodiments, each classification may indicate whether the classification is subject to a regulation 510, such as the General Data Protection Regulation in the European Union.

To protect the privacy of PII, a specific action may be performed by an external device to data classified with a classification that includes PII or is subject to GDPR, such as, for example, storing the data in a specific portion of at least one memory, deleting the data, making the data accessible to users with the proper access rights, masking the data, tagging the data so it cannot be used for certain processes, etc.

Each classification can include a tag or identifier indicating whether the classification type is subject to a regulation, as represented by an 'x' in the table 500. The tags may be maintained in a label master. In a label master, a hierarchy of labels may be maintained that can indicate a set of labels that relate to PII or the GDPR. The label master may utilize meta-data management around the labels or data classes.

In some embodiments, listing of classifications can be associated by language. As an example, for a 'State' classification, a subtype includes 'New York' and the French-language translation of New York.

If data is classified as sensitive data, an external device may utilize workflows to route and maintain tables of sensitive data in accordance with various rules or regulations.

Aggregator Overview

Figure 6:
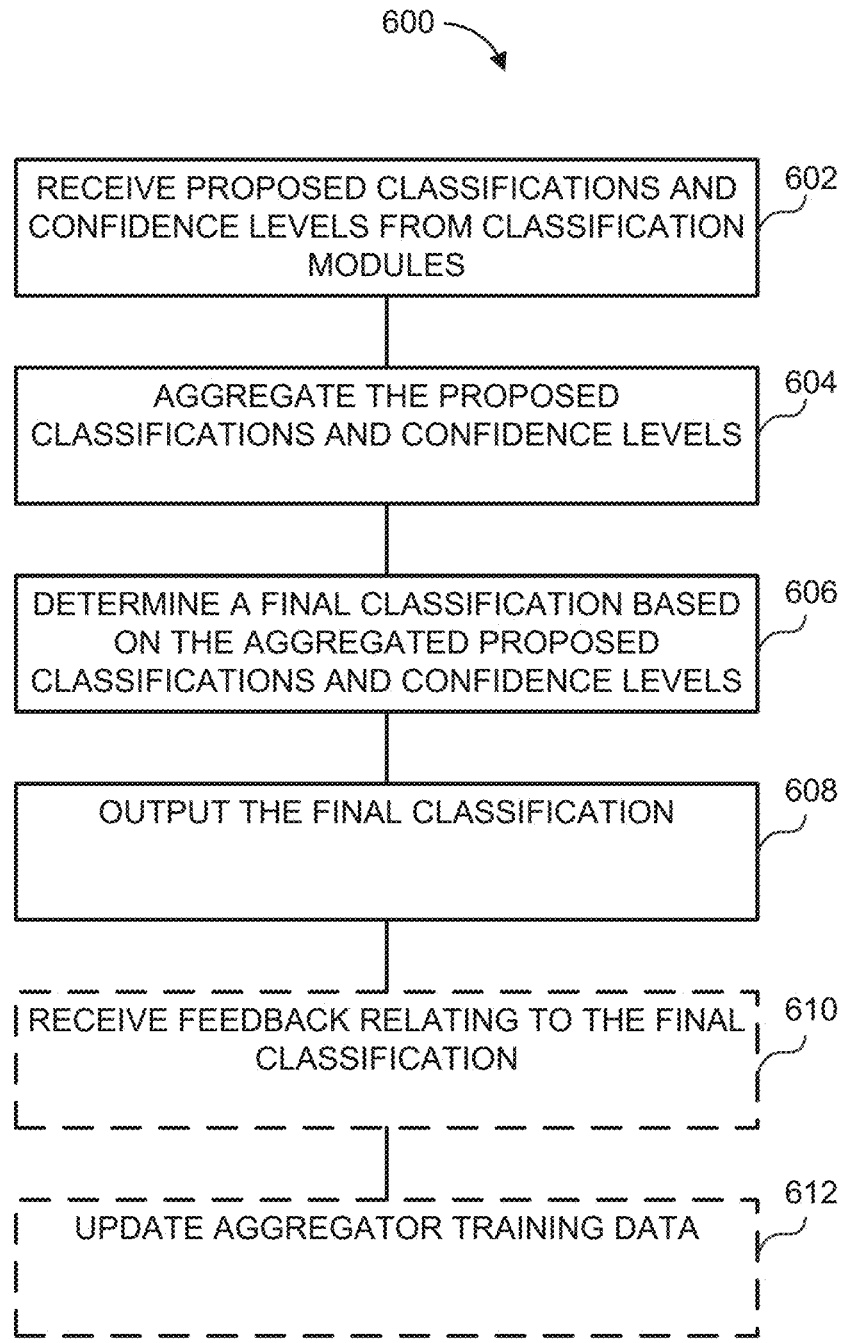
FIG. 6 illustrates a flow diagram for determining a final classification by an aggregator, in accordance with various embodiments.

FIG. 6 illustrates a flow diagram for determining a final classification by an aggregator, in accordance with various embodiments. The aggregator can receive proposed classifications and the confidence level from each classification module in the set of classification modules (block 602). Based on the proposed classifications and confidence values, the aggregator can determine a final classification that represents an accurate classification of the received data.

The aggregator can aggregate the proposed classifications and confidence values received from the set of classification modules (block 604). In some embodiments, the proposed classifications can be aggregated by classification type. As an example, if a received portion of text includes the word "Christian," classification modules may generate multiple proposed classifications. In this example, a first proposed classification may include a classification of "Religion," and a second proposed classification may include a classification of "Name." The aggregator may aggregate each proposed classification type, such as, for example, aggregating all proposed classifications for "Religion" and all proposed classifications for "Name" and their associated confidence levels.

The aggregator may utilize machine learning to generate a final classification. In other words, the aggregator may increase accuracy of final classifications based on information retained from previous iterations of generating final classifications of data.

The aggregator can inspect the aggregated proposed classifications and the confidence levels to determine a final classification (block 606). The aggregator utilizing multiple proposed classifications to determine a final classification may increase the accuracy in the classification of received data.

As an example, if a received portion of text includes the word "California," each classification module may identify a proposed classification of "State" with a high confidence level. The aggregator may inspect these proposed classifications and determine that the final classification is "State."

As another example, the aggregator can aggregate multiple proposed classifications for a received portion of text includes the word "Christian." A first aggregated classification type may include a proposed classification of "Religion" with a 40% confidence, and a second classification type may include multiple instances of a proposed classification of "Name" with both a 60% confidence and a 50% confidence. The confidence levels of each proposed classification type can be averaged by classification type. In this example, the first type "Religion" has a 40% overall confidence, and the second type "Name," may include an averaged 55% overall confidence. The aggregator can determine a final classification of "Name" based on determining the greatest averaged aggregated confidence level for each classification type.

In some embodiments, the aggregator can utilize training data to assist in determining a final classification for a portion of data. Training data may include information or insights identified during previous iterations of determining final classifications that may be used to increase the accuracy in determining subsequent final classifications. In some embodiments, training data can include a set of rules or patterns that are indicative of commonalities between previous iterations of determining final classifications and a present determination of a final classification. The aggregator can utilize the rules/patterns included in the training data when determining the final classification.

For example, training data may indicate that if a pattern of received text includes a series of numbers followed by one or more words, the classification is more likely to be an address. As another example, training data may indicate that if a prior final classification of a data stream is a "name," an adjacent portion of data from the stream of data has a greater likelihood of also being classified as a "name," as a given name and surname are often adjacent to one another.

As noted above, for each iteration of determining a final classification for data, the aggregator can translate any of the final classification, a confidence level, and characteristics of the received data into one or more numerical matrices. The numerical matrices can include numerical representations of the characteristics of iterations of final classifications of data. Each translated final classification may be represented by a point in a graphical representation of a numerical matrix, and the distance between points may represent a relative similarity between the characteristics of the iterations of final classifications. For example, points that within a close distance may include multiple similarities in any of the final classification type or the characteristics of the portions of data. The aggregator may identify clusters of points in a numeric matrix with similar characteristics, as shown in FIG. 4, for example.

In some embodiments, the aggregator may utilize clustering information to identify insights relating to various classifications. For example, multiple iterations of various classifications (e.g., 'names,' 'address,' 'IP address') may be translated into numeric vectors. In this example, clustering information can be utilized in identifying a final classification of data with a higher confidence value based on the numeric vectors.

The final classification determined by the aggregator can be outputted for a subsequent action (block 608). In some embodiments, the final classification is transmitted to a broker and forwarded to a controller, where the controller forwards the final classification to an external device that performs a subsequent action to the data based on the final classification. One such action that may be performed is storing the received data in a specific portion of at least one memory based on the classification. For example, the received data can be stored in a first portion of memory based on identifying that the classification of the data is a non-sensitive classification type.

In some embodiments, the received data may be stored in a specific portion of memory based on determining that the final classification of the received data indicates that the received text is sensitive in nature. This data can include data that includes PII or is within the bounds of a law/regulation in a specific jurisdiction. For example, a classification indicating that received data includes a social security number of an individual is indicative of an individual and is sensitive in nature. Based on such a determinization, the received data may be stored in a portion of memory that includes all sensitive data relating to the individual. Accordingly, based on a request, the sensitive data for an individual may be retrieved, deleted, sent to the individual, etc. In some embodiments, the classification and received text may be associated with a database, where the data can be identified using the database.

In some embodiments, the final classification and the received data can be transmitted to an external device with a request for feedback relating to the final classification (block 610). The feedback request may indicate a request to have the final classification inspected as to the accuracy with respect to the associated portion of data that the classification is classifying. The controller may receive feedback information from an external device. For example, feedback information may include an indication of whether the final classification is an accurate or inaccurate representation of the portion of data. Based on the feedback received, the external device may perform an action, such as storing the final classification, requesting the aggregator to modify the final classification, update the training data for the aggregator, etc.

In some embodiments, the training data utilized by the aggregator to determine a final classification may be updated (block 612). The training data may be updated based on any of determining clustering information from a numeric matrix of final classifications or receiving feedback from the external device relating to the accuracy of the final classification.

For example, if the final classification for the word "Christian" is a classification of "religion," and feedback is received indicating that the proper classification is "Name," the final classification may be modified, and the training data may be updated by the aggregator to include this change. In this example, the training data may be updated to include the feedback and the proper classification of the received data. Furthering this example, if a second instance of text including "Christian" similar to the first portion is identified, the training data may be utilized to identify that the final classification is more likely "Name" rather than "Religion," based on the updated training data.

In some embodiments, proposed classifications may be represented by aggregation tables. An aggregation table may be a representation of the aggregated proposed classifications that are aggregated by the aggregator. The aggregator may determine a final classification based on the content included in any of the example aggregation tables.

In some embodiments, the aggregator may implement re-training aggregation to aggregate the proposed classification and determine a final classification. In many cases, classifiers may have better or worse performance based on a subset of labels used. The aggregator may diversify the coefficients used for labels so that the classification may have a better performance and can make decisions as to classification, which may be visualized as a table of coefficients per label for each classifier.

The confidences illustrated in an aggregation table may be utilized in determining a final classification. For example, a first portion of data may be associated with various classifications (e.g., "Names," "Mail," "Date," "Country"), with each classification module providing a confidence level in that classification. The confidence levels for each classification may be combined and inspected to reduce the number of potential classifications or identify the final classification.

Each column can represent a different class. An expected vector can be returned as feedback. In some embodiments, the expected vector can include a '1' for an accepted classification or a '0' for a rejected classification. A classification result vector can include a vector created from each classification output. This input data format for learning can be presented as a sparse vector (depending on use classifier used can be represented as categorical value (1) or true-false sub-vector (2)).

The aggregation table may identify multiple potential approaches for re-training the aggregation. A first approach may be to make a simple convolution of results from different classifiers using the coefficients. Another approach may use different approaches for making the result data.

Utilizing multiple approaches may minimize error per each classification using coefficients. A threshold may be chosen, and coefficients may be based on a confusion matrix. A long vector may be included as an input for a neural net to minimize error. For each classification, a learning set may be generated by transforming and projecting a classifier vector and expected vector.

For example, for a classification of "Name," a first column may be an identifier ID, a second column ML Result may indicate a value returned for the "Name" class from a Machine Learning classification module. A third column may include a dictionary result indicating a value returned for the "Name" class from a dictionary classification module. A fourth column may include WAS EXPECTED?, which may return a '1' value indicating that the received data was labeled as a "Name" class and a '0' value if not.

In some embodiments, the aggregator may utilize a neural network to assist in the aggregation and determining a final classification. A neural network may be used for making a convolution of given results. An input may include a long vector created from the received classification vectors received by classification modules. An output may include a vector of probabilities for each classification. The aggregator can determine the final classification by inspecting the output vector for each classification.

In some embodiments, data received by requests may not be stored. Based on this, the system may receive, and parse feedback information received from an external device. The controller may receive data from a database. If a classifier is changed, the results may be updated. Feedback can be overridden, where the system may check all given feedback for an identifier and aggregate the feedback, where the last feedback can override earlier inputs. The gathered data may be used to create a compressed representation in a post process that includes the classification vectors and expected vectors.

Evaluation Metrics

Evaluation metrics may be used to train or re-train components included in the production architecture. In a training process, evaluation metrics may be utilized to quantify a quality of the classifications generated. In other words, evaluation metrics may be utilized to identify an overall accuracy of classifications generated.

Evaluation metrics may be based on any of accuracy or performance of classifications. For example, evaluation metrics may represent a speed of a classification module (e.g., how many proposed classifications can be generated within a given time period).

Evaluation metrics may include a confusion matrix that is indicative of how often the aggregator identifies the correct and incorrect classification in its final classification. A confusion matrix may include Boolean values (true-false) that divide the result into 4 types: True Positive (TP)—properly classified "true" class, True Negative (TN)—properly classified "false" class, False Negative (FN)—"true" class classified as "false", and False Positive (FP)—"false" class classified as "true."

Accuracy may be a metric which describes how often the aggregator makes a proper choice, with true as positive and false as negative. In terms of the confusion matrix, an accuracy can be defined as a function of the confusion matrix.

A false positive may differ from a false negative. In some embodiments, the system may end up with returning only some values above certain threshold, which may return only those which are considered the most appropriate. The system may go for as low as possible false positive rate even if the system ends up with returning no matching classes.

The classification results may be described using any of a precision, recall, and an F1 score. Precision may indicate how often the aggregator determines a correct (or positively returned) classification. Recall may indicate how often the aggregator returns a positive classification out of all that are to be returned. In some cases, the precision may rise and the recall may drop. This may be a result of making less mistakes on "true" classifications, but eventually it may return a "true" classification less often. On the other hand, the system can return more results but also with more improper classifications among them. Accordingly, recall may rise and precision may fall.

As F1 score may include a harmonic mean of the precision and recall to complete the picture and choose a "balanced" point between returning only proper classifications and returning all proper classifications.

In some embodiments, if a focus is on a low false positive rate, a base metric may be precision. However, a decision may not be based solely on precision, as the system may give a correct answer, and recall may be at least partially utilized in making a decision.

In some embodiments, one of two approaches may be performed by the aggregator. A first approach may include maximizing precision without recall falling down below a certain threshold. A second approach may include calculating a weighted metric, which may promote precision.

In some embodiments, multiple inputs may be sent with proposed probabilities that may be used as a way to sort results in a given order. The proposed probabilities may also give information indicating what model predicted as more probable. The classifications that should be assigned with a given example may be compared with an expected result. In an evaluation script, it may be assumed that N top results that are positive and the rest may be negative. The only exception may be that if more than N results have the same probability as if they were all taken as positives. For each model and probability, each label may define a threshold above which it is assumed that the label is a "positive."

In some embodiments, the aggregator may make a flexible decision based on the results. It may be possible to separate a "leader group" from all of results. A leader group may be a group of top results which are relatively close to each other and relatively far from the rest of results. Accordingly, determining and finding a "leader group" may include clustering, calculating standard deviation for and between groups, etc.

The system may include a data flow. A data flow may include two clusters, a production cluster where the models may be hosted and a data cluster. A customer device may send sample/profiling data to the ML platform through a secure connection. A ML platform gateway may forward the request to the controller of the data classification model. Information about the request may be stored in at least one memory. The controller may send data to a message broker, where it may be processed by the subcomponents. A database may keep a list of requests/columns being processed. The customer device may poll for results, when the results are retrieved all traced of the request are also removed from the database.

In some embodiments, feedback may include a customer accepting or rejecting the final classification provided by the aggregator. The feedback may be sent back to the system via an external device associated with the customer. Sample data/profiling may be sent to the ML platform with the extra feedback from the customer. The controller may forward the feedback data to a database. The system may periodically offload the data from the database to at least one storage module, which may be copied to storage module(s) on the data cluster. In some embodiments, retraining the feedback data may occur on the data cluster, based on the feedback that's stored on the storage modules, per customer. The system may also keep full traceability of the classification models, and customer feedback may be ingested and processed to be used in training data.

Figure 7:
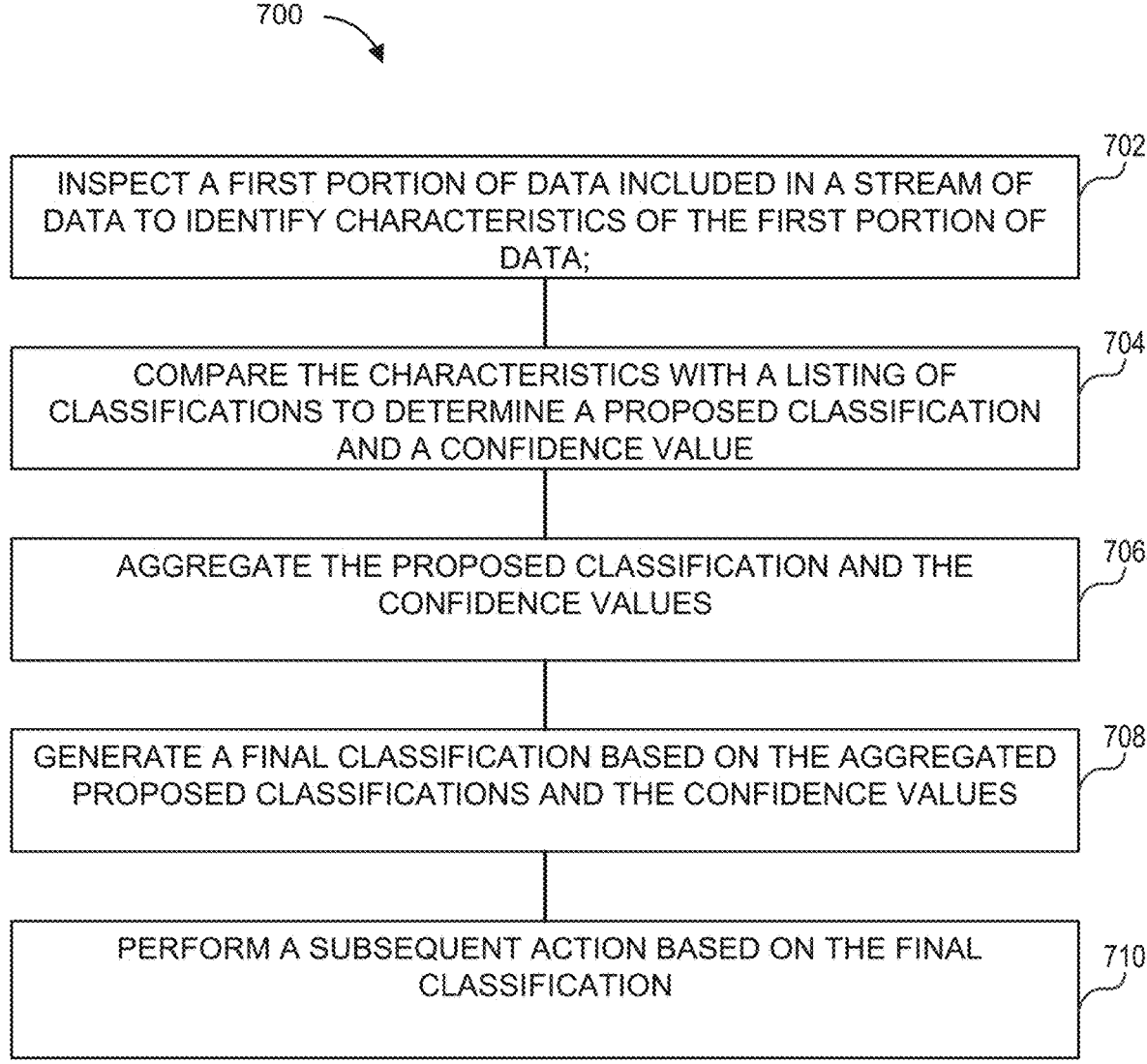
FIG. 7 illustrates a block diagram of a method to generate a classification for data, in accordance with various embodiments.

FIG. 7 illustrates a block diagram of a method to generate a classification for data, in accordance with various embodiments.

Each classification module included in a set of classification modules may inspect a first portion of data included in a data stream to identify a set of characteristics of the first portion of data (block 702). The set of characteristics may include features of the first portion of data, such as, for example, text, objects, the location of the first portion of data in a digitized document, etc. The set of characteristics may be determined using one or more techniques, such as by dictionary matching, regular expression (Regex) pattern matching, using training data, etc.

In some embodiments, the wherein the set of classification includes a learning module. The learning module may include at least one of a dictionary and a regular expression listing and a training module. The training module may be configured to inspect the proposed classification, the confidence value, and the final classification. The training module may determine an accuracy of the proposed classification to the first portion of data and a number of differences between the proposed classification and the final classification. The determined accuracy and number of differences may be included into training data, where the training data may be utilized in subsequent iterations of classifying data to determine subsequent proposed classifications of data.

In some embodiments, inspecting the first portion of data to identify the set of characteristics comprises identifying at least one entry listed in a dictionary associated with any classification module included in the set of classification modules that includes a similarity between the first portion of data and the at least one entry that exceeds a threshold similarity, wherein the set of characteristics includes the at least one entry listed in the dictionary that includes the similarity that exceeds the threshold similarity.

In some embodiments, inspecting the first portion of data to identify the set of characteristics comprises identifying at least one pattern included in a regular expression listing associated with any classification module included in the set of classification modules that includes a number of differences between the first portion of data and the at least one pattern that is less than a threshold difference, wherein the set of characteristics includes the at least one pattern included in the regular expression listing that includes the number of differences that is less than the threshold difference.

The identified set of characteristics may be compared with a listing of classifications to determine a proposed classification and a confidence value (block 704). The proposed classification may identify a classification listed in the listing of classifications that contains a similarity to the set of characteristics of the first portion of data that exceeds a threshold similarity. The confidence value may include a value indicative of an estimation of the proposed classification accurately describing the first portion of data. The proposed classification and confidence value may be sent to an aggregation module.

An aggregation module may aggregate the proposed classification and the confidence values determined by each classification module in the set of classification modules (block 706).

The aggregation module may generate a final classification based on the aggregated proposed classifications and the confidence values of the classification modules in the set of classification modules (block 708).

In some embodiments, generating the final classification includes identifying each classification type included in the received proposed classifications, each classification type included in the listing of classifications. The aggregation module may compare each identified classification type and confidence values to identify an overall confidence for each classification type. The aggregator can determine the final classification by identifying the identified classification type that includes a greatest overall confidence.

In some embodiments, the method may include determining a final classification accuracy indicating an accuracy between the first portion of data and the final classification. The aggregator may add the final classification accuracy into a set of aggregator training data configured to be utilized in subsequent iterations in determining final classifications of data.

In some embodiments, the method may include sending a request for feedback to an external device, the request for feedback may include any of: the final classification, the first portion of data, and the final classification accuracy. A response from the external device may be received that includes feedback information, where the feedback information is added into the set of aggregator training data.

In some embodiments, the method may include translating the final classification and the first portion of data into at least one vector that is incorporated into a numerical matrix identifying quantified characteristics of the final classification and the first portion of data. A cluster may be identified in the numerical matrix. The cluster may be indicative of iterations of final classifications and data with common characteristics, wherein information relating to the cluster is added into the set of aggregator training data.

The aggregation module may transmit the final classification to an external device to perform a subsequent action based on the final classification of the first portion of data (block 710). In some embodiments, the aggregation module may transmit the final classification to a broker, the broker can forward the final classification to a controller, and the controller can forward the final classification to the external device. The subsequent action can include any of: storing the first portion of data in a first location in at least one memory that is associated with data that includes the final classification, sending the first portion of data to an external device, deleting the first portion of data, and storing the first portion of data in a second location in at least one memory that is associated with data that includes data indicative of an individual.

In some embodiments, the final classification may be inspected to determine whether the final classification includes an identifier indicating that the final classification includes information indicative of an individual. Information indicative of an individual may include PII, GDPR, or any information identified by a law/regulation imposed by a jurisdiction. The external device may be configured to identify a subset of actions representing actions to the first portion of data that maintain the information indicative of the individual. The subset of actions can include, for example, storing the first portion of data in a specific portion of memory that includes other information indicative of the individual, updating a database to identify the first portion of data, deleting the first portion of data, transmitting the first portion of data to an external device, etc. The external device may perform the subsequent action that includes one of the subsets of actions based on determining that the final classification includes the identifier.

Example Processing System

Figure 8:
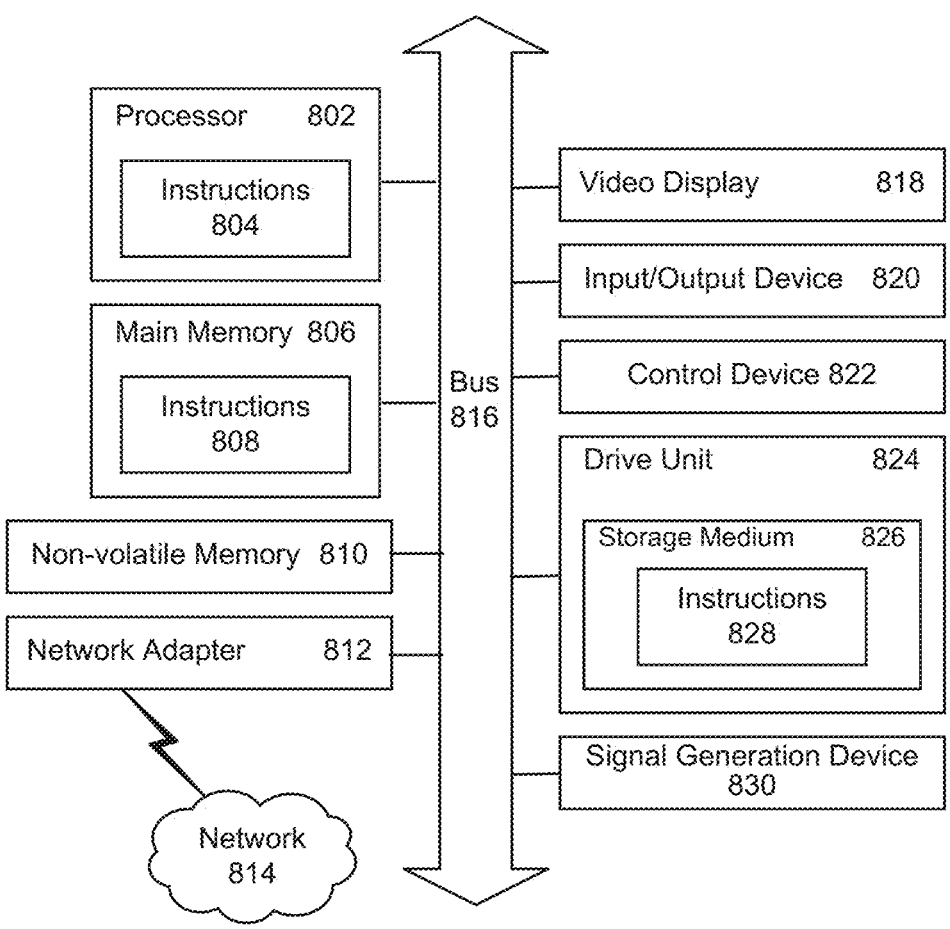
FIG. 8 is a block diagram that illustrates an example of a processing system in which at least some operations described herein can be implemented.

FIG. 8 is a block diagram illustrating an example of a processing system 800 in which at least some operations described herein can be implemented. As shown in FIG. 8, the processing system 800 may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 800 operates as part of a user device, although the processing system 800 may also be connected (e.g., wired or wirelessly) to the user device. In a networked deployment, the processing system 800 may operate in the capacity of a server or a client machine in a client-server network environment, or as a peer machine in a peer-to-peer (or distributed) network environment.

The processing system 800 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 800.

While the main memory 806, non-volatile memory 810, and storage medium 826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 812 enables the processing system 800 to mediate data in a network 814 with an entity that is external to the processing system 800 through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method performed by a system to classify data, the method comprising:
    obtaining, by each classification module included in a set of classification modules, a stream of data;
    inspecting a first portion of data included in the stream of data to identify characteristics of the first portion of data;
    comparing, by each classification module in the set of classification modules, the identified characteristics with a listing of classifications to determine a proposed classification and a confidence value, each proposed classification identifying a classification type included in the listing of classifications that matches the characteristics of the first portion of data with a first similarity exceeding a first threshold similarity;
    aggregating, by an aggregation module, the proposed classifications and the confidence values by each classification type;
    generating, by the aggregation module, a final classification based on the aggregated proposed classifications and the confidence values; and
    sending the final classification to an external device to perform a subsequent action.

2. The method of claim 1, wherein the stream of data includes data structured in a table included in a database, wherein each portion of the stream of data represents a column of the table included in the database.

3. The method of claim 1, wherein the set of classification modules include:
    a dictionary module configured to compare the identified characteristics of the first portion of data with entries included in at least one dictionary;
    a regular expression module configured to compare the identified characteristics of the first portion of data with regular expression patterns included in at least one regular expression pattern listing; and
    a learning module configured to compare the identified characteristics of the first portion of data with a set of training data.

4. The method of claim 2, further comprising:
    translating each column of data and the proposed classifications into at least one numeric vector identifying quantified characteristics of each column of data and each proposed classification.

5. The method of claim 2, wherein the learning module is configured to:
    generate a first proposed classification and a first confidence value based on comparing the characteristics of the first portion of data and the listing of classifications with the set of training data;
    determine at least one rule corresponding to the characteristics of the first portion of data and the generated first proposed classification; and
    incorporate at least one rule into the set of training data.

6. The method of claim 1, wherein said generating the final classification further comprises:
    comparing the aggregated proposed classifications and the aggregated confidence values for each classification type with a set of rules utilized by the aggregation module to determine the final classification;
    determining at least one rule corresponding to a common characteristic between the aggregated proposed classifications and the final classification; and
    incorporating at least one rule into the set of rules.

7. The method of claim 1, further comprising:
    inspecting the final classification to determine whether the final classification includes information indicative of an individual; and
    appending a tag onto the first portion of data based on determining that the final classification includes information indicative of the individual.

8. The method of claim 1, wherein the set of classification modules and the aggregation module forward information to the external device via a broker.

9. The method of claim 1, wherein the subsequent action performed by the external device includes any of: storing the first portion of data in a first location in at least one memory, sending the first portion of data to an external device, deleting the first portion of data, and storing the first portion of data in a second location in at least one memory associated with data identified as indicative of an individual.

10. The method of claim 1, further comprising:
    sending a request for feedback to an external device, the request for feedback including any of the final classification and the first portion of data; and
    receiving a response from the external device including feedback information, wherein the feedback information is added into a set of aggregator training data utilized by the aggregation module for generation of subsequent final classifications.

11. The method of claim 1, further comprising:
    translating the final classification and the first portion of data into at least one numeric vector representing quantified characteristics of the final classification and the first portion of data.

12. A system comprising:
    a set of classification modules including a dictionary module, a regular expression module, and a learning module, where each classification module is configured to:
        obtain a first set of data structured into columns of data in a database;
        identify characteristics of a first column of data of the database included in the first set of data; and
        determine a first proposed classification from a listing of classifications and a first confidence value, the first proposed classification identifying a classification in the listing of classifications that matches the identified characteristics of the first column; and
    an aggregation module configured to:
        receive the proposed classifications and the confidence values determined by each of the set of classification modules;

aggregate the proposed classifications and the confidence values by classification type;
determine a final classification based on the aggregated proposed classifications and the confidence values; and
send the final classification to an external device configured to perform a subsequent action to the first set of data based on the final classification.

13. The system of claim 12, further comprising:
a broker connected to the set of classification modules and the aggregation module, the broker configured to:
transmit the first set of data to each of the set of classification modules;
forward the proposed classifications from the set of classification modules to the aggregation module; and
receive the final classification from the aggregation module; and
a controller connected to the broker and the external device, the controller configured to forward the final classification from the broker to the external device.

14. The system of claim 12, wherein the dictionary module is configured to:
identify an entry listed in at least one dictionary included in the dictionary module that matches the characteristics of the first column of data;
compare the identified entry with each classification listed in the listing of classifications to determine a first classification that includes a similarity to the entry that exceeds a threshold similarity, the proposed classification of the dictionary module including the first classification; and wherein the regular expression module is configured to:
identify a pattern listed in at least one regular expression pattern listing included in the regular expression module that matches the characteristics of the first column of data;
compare the identified pattern with each classification listed in the listing of classifications to determine a second classification that includes a similarity to the pattern that exceeds the threshold similarity, the proposed classification of the regular expression module including the second classification.

15. The system of claim 12, wherein the learning module is configured to:
generate the proposed classification and the confidence value based on comparing the characteristics of the first column of data and the listing of classifications with a set of training data associated with the learning module;
determine at least one rule corresponding to the characteristics of the first column of data and the generated proposed classification; and
incorporate at least one rule into the set of training data.

16. The system of claim 12, wherein the aggregation module is further configured to:
inspect the final classification to determine whether the final classification relates to a classification that includes information indicative of an individual;
appending a tag to the final classification, wherein the external device is configured to perform any of a subset of subsequent actions with the first set of data based on receiving the final classification with the tag.

17. A method performed by an aggregation module to classify data, the method comprising:
receiving a proposed classification and a confidence value for a column of data included in a first set of structured data from each of a set of classification modules, wherein each proposed classification indicates a classification included in a listing of classifications and each confidence values indicates an accuracy of the proposed classification as relating to characteristics of the column of data;
aggregating the received proposed classifications and confidence values based on each classification type listed in the listing of classifications;
comparing the aggregated proposed classifications to identify a final classification; and
transmitting the final classification to an external device configured to perform a subsequent action to the column of data based on the final classification.

18. The method of claim 17, wherein the set of classification modules include:
a dictionary module configured to:
identify an entry listed in at least one dictionary included in the dictionary module that matches the characteristics of the column of data;
compare the identified entry with each classification listed in the listing of classifications to determine a first classification that includes a similarity to the entry that exceeds a threshold similarity, the proposed classification of the dictionary module including the first classification;
a regular expression module configured to:
identify a pattern listed in at least one regular expression pattern listing included in the regular expression module that matches the characteristics of the column of data;
compare the identified pattern with each classification listed in the listing of classifications to determine a second classification that includes a similarity to the pattern that exceeds the threshold similarity, the proposed classification of the regular expression module including the second classification; and
a learning module configured to:
generate a third proposed classification based on comparing the characteristics of the column of data and the listing of classifications with a set of training data associated with the learning module;
determine at least one rule corresponding to the characteristics of the column of data and the generated proposed classification; and
incorporate the at least one rule into the set of training data.

19. The method of claim 17, further comprising:
sending a request for feedback to the external device, the request for feedback including the final classification and the column of data; and
receiving a response from the external device including feedback information.

20. The method of claim 19, further comprising:
incorporating the received feedback information into any of a set of training data configured to be utilized by the set of classification modules through a re-training process to improve subsequent proposed classifications of other portions of data.

* * * * *